2,711,957

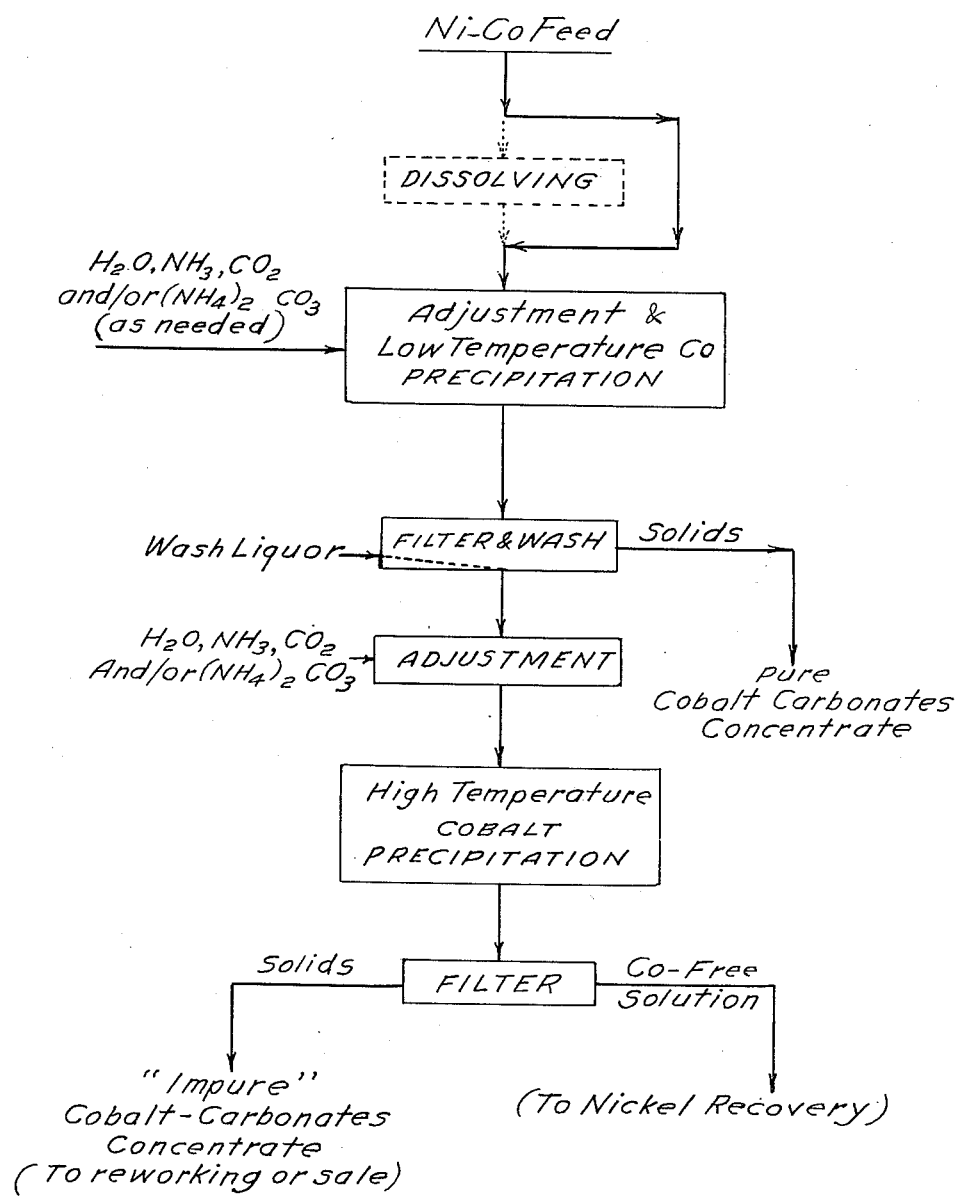

METHOD OF SEPARATING COBALT AS CARBONATES FROM NICKEL-COBALT MIXTURES

Felix A. Schaufelberger, Yonkers, N. Y., assignor to Chemical Construction Corporation, New York, N. Y., a corporation of Delaware Application September 23, 1952, Serial No. 310,954

3 Claims. (Cl. 75—119)

This invention relates to the hydrometallurgy of nickel and cobalt. More specifically, it is concerned with a selective separation of nickel, especially free of cobalt, from solutions containing salts of both nickel and cobalt. Still more particularly, it involves a method whereby substantially all the cobalt content of such solutions is precipitated as cobalt carbonate, leaving a solution from which metallic nickel is easily precipitated by known methods.

Nickel and cobalt metals are very similar in many physical chemical characteristics. The same is true of their salts and naturally-occurring minerals. Moreover, minerals of both generally occur together in natural deposits and usually cannot be separated by ordinary dressing practices. For these reasons, both metals are generally present, in varying amounts, in any solution resulting from any type of leaching of materials containing cobalt and nickel.

This results in many technical and economic problems. For example, in most ordinary practices, small amounts of cobalt present in nickel ore concentrates represent little of benefit to the nickel producer. Very little cobalt available in such materials is recovered and sold as such, primarily because by current methods the cost of separation equals or exceeds the additional value. Much, if not most, of the cobalt is lost in the slag from nickel smelting. The remainder is sold as "nickel" in nickel metal bullion or cathodes.

Similarly, small amounts of nickel present in cobalt concentrates and, therefore, in the "cobalt" solutions after leaching are of small value. It is generally either discarded, a considerable loss, or is recovered with the "cobalt." In the latter case, the nickel becomes an impurity in the cobalt metal and generally the producer is not paid for it. While certain nickel and cobalt mixed metals are marketable as such, it is usually at a price below the value of the pure metals in separate products.

In conventional metallurgy of nickel and cobalt, then, the presence of smaller but appreciable quantities of either in sources of the other, i. e., in ores, ore concentrates, scrap metals, plant by-products and the like, presents a serious and difficult problem. This problem has heretofore been variously attacked. However, a generally practicable treatment, whereby the bulk of each may be recovered in a separate, relatively-pure metal product, has not been offered.

Many processes have been proposed for separation and recovery of cobalt and nickel from mixed electrolytes. Several have been used quite extensively. Most involve the same two facts, that cobalt is more readily oxidized to the trivalent state than is nickel and that cobaltic hydroxide is relatively more insoluble at lower pH values than is nickelous hydroxide. Unfortunately, the necessary steps are complicated and repetitive, the hydroxides are difficult to filter efficiently and the resultant separations are far from perfect. Moreover, most of them also require large quantities of chemical reagents, many of which are non-regenerative. In addition to the effect on costs, this creates a disposal problem.

Several methods of separating nickel and cobalt from ammonium carbonate leach liquors also have been proposed. Most of these involve fractional distillation of the ammonium carbonate. Liquor, at different stages in the process, thereby becomes concentrated with either nickel or cobalt by precipitation of the other as hydrated oxides. Concentrated liquor is removed and treated. The precipitates must be redissolved and retreated. However, as processing methods, or as to final products, these are economically and practically little better than the electrolyte treatments.

Such conventional processes for the production of nickel or cobalt product, then, are commercially unsatisfactory as too complicated, wasteful, or uneconomical, or as resulting in products containing undesirably large amounts of the other element. Neither do they produce saleable metals. The resultant oxides or hydroxides must be processed further to obtain this result.

In the copending application for United States Letters Patent, Serial No. 310,953, filed of even date by F. A. Schaufelberger, the applicant herein, it has been shown that cobalt-nickel solutions, containing as much as 100 grams/liter of metallic nickel plus cobalt dissolved as carbonate or 155 grams metal dissolved as sulfates can be treated to seletcively precipitate the cobalt content as a cobalt carbonate. Removal of the precipitate leaves a solution, substantially cobalt-free, from which substantially cobalt-free nickel can be recovered in any desired manner.

Precipitation of the cobalt carbonate is produced by adjusting the content of dissolved materials and then heating the resultant solution. Depending upon the dissolved cobalt and/or nickel content, the solution is given a controlled content of available ammonia and ammonium carbonate at which all the metal is held in solution at ambient temperatures. The solution is then heated at temperatures of from about 140° C. to about 170° C. until cobalt precipitation ceases. The precipitate, after washing, will quantitatively contain the cobalt and some of the nickel in amounts which may range from a cobalt:nickel ratio of 1:1 up to as high as 50:1. The resulting solution contains the bulk of the nickel and less than 0.1 g./l. of cobalt.

In accordance with the present invention, a modified and improved process is made available, in which, for any apparatus of fixed capacity, in a given time, even greater quantities of cobalt and nickel-containing feed may be processed. The present process has the advantage that much of the cobalt can be obtained as a cobalt carbonate in a substantially nickel-free condition. Such a cobalt carbonate concentrate is a highly desirable product, being readily processed or sold.

In general, an outline of the present process may be quite simply stated. It differs from the original process in that more than one cobalt product is taken. Solution containing dissolved cobalt and nickel is treated by suitable adjustment of the carbonate content to precipitate only so much of the cobalt carbonate as will precipitate in a nickel-free condition. This "pure" cobalt carbonate precipitate is removed. Residual solution may then be treated to precipitate the remainder of the cobalt by adjustment, if necessary, of the ammonium carbonate content, followed by heating. This impure cobalt precipitate is collected and resultant cobalt-free nickel solution passed to some suitable nickel-recovery system.

Where in the present specification and claims the terms "free' or "available" ammonia are used, it is intended to designate any ammonia dissolved per se or as ammonium hydroxide and any ammonia combined with the metals as metal-ammonium complex ions.

It is believed that a description of the invention may be more readily followed with reference to the accompanying drawing. Therein, in simplified form, is shown a flow diagram of the principal steps in the present process.

As may be seen from the drawing, feed to the present process is designated as nickel-cobalt (Ni-Co) feed. So far as the present process is concerned, its origin is irrelevant. Methods are known whereby the nickel and cobalt content of various feed sources, such as ore concentrates, plant by-products and the like, may be put into the solution, sufficiently free from other extraneous metals and impurities with which they have previously been associated. Any of such processes may have been used as the source of the feed herein.

Since the feed is obtained from such sources, it may be in one or more differing physical conditions. It may be and usually is a solution. It also may be in the form of solid salts, oxides and hydrated oxides or hydroxides. Basic sulfates and/or carbonates are commonly encountered. Feed may be in the form of a slurry, in which part of the cobalt-metal bearing solids are in suspension, the remainder being salts in solution. As will be brought out, the procedure of the present invention is applicable for the treatment of a feed originally obtained in any of these states.

It is a primary object of the invention to obtain a substantially nickel-free cobalt carbonate concentrate. Accordingly, nickel in the feed must be in solution. Where the feed is obtained as a solution, there is no problem. If the feed is totally in solid form, at least a part thereof must be dissolved. If it is in the form of slurry, at least a part of the solids will be taken into solution in the suspending fluid. When the cobalt is not in the form of carbonate it is dissolved to facilitate precipitation as such. Accordingly, in the drawing, the first step is shown as dissolving. Since it may not be required it is shown in dotted lines. If this step is unnecessary, it may be by-passed, as shown.

Since for best operation the limitations on the solute contents are critical within certain limits, the next step has been shown as a solution "adjustment." Herein, the necessary materials and/or diluents are added to bring the dissolved constituents within the desired or necessary limitations.

In general, in both the dissolving and the adjustment steps, substantially the same limits on the materials in solution are applicable. Therefore, the conditions applicable to the "solution" for both steps will be considered together.

In general, the applicability of the present process is not limited to the treatment of solutions containing salts of particular acids. Provided the anions do not produce cobalt and nickel salts less soluble than the carbonates or practically undissociated complexes such as with cyanide, the process may be utilized thereon. As a practical matter, the sulfates and carbonates will be those most commonly encountered and will be taken as illustrative.

As noted above, ordinarily the feed will have resulted from operations to eliminate metallic elements other than cobalt and nickel. For practical purposes, therefore, the materials to be considered in the adjustment may be limited. They are the dissolved quantities of cobalt and nickel salts and the amounts of ammonium carbonate and of available ammonia. Each of these is important, for one reason or another.

The applicability of this process is not restricted to any particular proportions of nickel to cobalt in the solution. Solutions containing high-nickel, low-cobalt contents; nickel and cobalt in approximately equal amounts; and low-nickel, high-cobalt concentrations all may be handled. However, only in solutions having a cobalt to nickel ratio greater than one is the amount of pure cobalt precipitate sufficiently large to warrant recovery thereof.

In general the total dissolved metal content should not be too high. However, metal salt concentrations up to an equivalent of about 100 grams/liter of metallic nickel plus cobalt dissolved as carbonates and about 135 grams/liter of metal dissolved as sulfates can be handled. A preferred range of from about 40 up to about 65–70 grams/liter for carbonates and 80–90 for sulfates constitutes a good average practice. While the process is operable below about five grams/liter, such solutions are too dilute to be economically practicable.

Whether the initial feed solution contains sulfates, carbonates or some other suitable anion, during the present process cobalt carbonate is formed, if not already present. Neither cobalt nor nickel carbonate is sufficiently soluble in water to permit dissolving the amounts of these elements referred to in the previous paragraph. Sufficient solubility here is due to the formation of some ammoniacal complex. Formation of the latter requires free ammonia in adequate amount. However, solubility of the complex in the solution depends not only on the available ammonia but also on the ammonium salt concentration. Solubility is increased by an increase in ammonia and to a lesser extent by an increase in ammonium sulfate. Addition of ammonium carbonate will at first increase and then decrease the solubility, especially of cobalt. Since cobalt is to be precipitated as carbonate, the salt used in adjustment normally will be ammonium carbonate.

Nickel and cobalt form various complexes with ammonia. Those in which the ammonia:metal ratio is about two or more cause a large increase in solubility of salts of these elements in near neutral solution. With carbonates and sulfates, the principal salts encountered in commercial practice, the amounts of available ammonia is a major factor in keeping the cobalt in solution. Ordinarily, complete nickel solution may be obtained with an available ammonia:metal mol ratio of about 1.5–2.0. At these ratios, however, cobalt solubility in carbonate solution is low and a higer ratio will generally be used. Too high a ratio, however, will require excessive $CO_2$ in subsequent carbonation. For this reason, the ratio usually will not be greater than about 4.0, a good general range being about 2.5–3.5

Nickel solubility is increased with the increasing amounts either of available ammonia or ammonium salt. In the present process it is necessary to keep nickel in solution selectively with respect to the cobalt. In the range, therefore, in which adding more ammonia would tend to excessively increase cobalt carbonate solubility, it is best to employ the ammonium salt, i. e., the carbonate.

In the process of the above identified copending application, however, a careful balance is required in order not to prematurely precipitate cobalt. In the present process where only nickel solubility is primarily necessary, it is not essential that the ammonium carbonate content be restricted. The amount of available ammonia content may be kept at about an ammonia:metal ratio of about 2.5–3.5, and nickel solubility insured by increasing the ammonium carbonate content. This has an added advantage in that preformed ammonium carbonate can be used to a considerable extent, thus reducing the consumption of added ammonia.

The combination of dissolving and/or adjustment steps provides for complete solution of nickel and usually at least part of the cobalt, including cobalt precipitates other than carbonates. Precipitation of as much of the cobalt as possible in a substantially nickel-free condition is then initiated. This is accomplished by increasing the carbonate content of the adjusted solution or slurry. This is most conveniently done by subjecting the solution or slurry to an atmosphere of $CO_2$ at some mild pressure of 0–100 lbs. per square inch gauge. Treatment is conducted for sufficient time to precipitate as much cobalt carbonate as possible in a nickel-free condition.

Since precipitation is obtained by controlling the carbonate content, it may be that a sufficient amount of cobalt carbonate is present at the end of the so-called adjustment step. Accordingly, in the drawing the adjustment step and low-temperature cobalt precipitation have been indicated as a single operation.

Precipitation of cobalt as carbonate occurs when in solution in its bivalent form. As noted above, feed solution will generally have been treated for removal of extraneous metal values. Accordingly, the condition will usually prevail in which a major portion of cobalt is originally present in this form. If not, this condition may be easily obtained by reduction of the three valent cobalt.

Neutralization of ammonia by addition of $CO_2$ is accompanied by liberation of heat, increasing the temperature of the solution or slurry. Extent of temperature increase depends upon the amount of $CO_2$ added, the scale of operation and other factors which affect the dissipation of heat. However, over the range of 20°–80° C., temperature appears to have no major effect on the solubility of cobalt carbonate.

Slurry from the precipitation step is filtered or subjected to some other mechanically equivalent solid-liquid separation step such as decantation and centrifugal separation. Separation under pressure may be desirable, especially if a substantial rise in temperature has occurred. Heat, gas, and time may be saved if the filtrate can be sent directly to the next stages in the general operation without having to be pressure relieved and cooled.

It is a particular advantage of the present invention that the precipitate is easily filtered and washed. It shows little or no tendency to adhere to the vessel. This is a marked contrast to the problems encountered in previous practices which, during distillation, produced hydrates and basic carbonates that were troublesome to handle. Precipitates having cobalt:nickel ratios of 150:1 up to 250:1 are easily obtained.

Usually the collected solids are washed. In so doing the amount of liquid should be minimized in order to avoid unecessary dilution of the fluids handled in subsequent steps. A good practice is to use a solution containing a high content of ammonium carbonate for the washing so as to remove any nickel which may be present. Ordinarily the filtrate and the washings may be combined.

Filtrate is then treated to remove the balance of cobalt by adjustment of dissolved contents followed by a heating operation. Depending upon the dissolved metal content, the filtrate should contain from about 2 to 4 mols of ammonia per liter, and from 1 to 4 mols of ammonium carbonate per liter. In general it is desirable to keep the ammonia content fairly low, usually about 2.5 mols of ammonia per mol of dissolved metal. If the dissolved constituents of the filtrate do not fall within these ranges they may be brought to these concentrations in a second adjustment step as shown. Since this second adjustment is generally necessary after removal of a nickel-free cobalt product, it is not shown as by-passed. However, if it is not necessary it may be omitted nevertheless.

Adjusted filtrate solution of the proper dissolved content for cobalt stripping is then subjected to heating in an agitated autoclave to effect the final cobalt removal. A temperature of about 140°–170° C. may be used with a preferential range up to about 155°–160° C. Precipitation will usually be complete in a few minutes but temperatures may be maintained up to about 30 minutes to insure complete reaction.

The slurry is then removed from the autoclave and cooled, preferably by flashing. Ammonia and carbon dioxide released during this operation should be collected and recovered. Final precipitate is collected by filtering or a mechanically equivalent operation. The filter cake is usually washed, preferably with an ammonium carbonate solution.

Both filtering and washing may be done before or after pressure relief and cooling. It is usually simpler where convenient to filter under pressure and then accomplish the cooling by flashing off water, $CO_2$ and $NH_3$. Particularly is this true when other salts than the carbonate are present in the solution. The hot filtrate, rather than being flash cooled, may be boiled to drive off $CO_2$ and $NH_3$, the resultant solution treated to recover the additional ammonium salt where the latter is a useful product, such as ammonium sulfate.

The filtrate after the cobalt precipitation contains less than 0.1 g./l. of cobalt. It may be treated in any desired manner to recover the nickel content thereof as a pure product.

The solid cake or "impure" cobalt carbonate concentrate may be recycled or reworked to reduce its nickel content. The latter will vary from cobalt:nickel ratios of about 1:1 up to about 50:1, depending, to a considerable extent, upon the original feed ratios. Rather than being reworked, it may be utilized or sold as a source of mixed metals.

Utilization of the process of the present invention may be shown in the following examples which are intended as illustrative only.

*Example 1*

A filtrate obtained in the leaching of a cobalt-nickel sulfide ore was found to contain after adjustment:

|  | gr./lt. | mols/lt. |
|---|---|---|
| Cobalt | 59 | 1 |
| Nickel | 3 | 0.05 |
| Ammonium sulfate | 130 | 1 |
| Ammonia | 60 | 3.5 |

A sample of this solution, in which cobalt was substantially all in bivalent form, was placed in a pressure vessel and with mild stirring subjected to a pressure of 50 lbs./sq. in. of $CO_2$ until precipitation substantially ceased at the end of about ten minutes. Resultant slurry was filtered and washed twice with small volumes of saturated ammonium carbonate solution under about 30 lbs./sq. in. of $CO_2$ pressure. This was followed by one washing under pressure with a small amount of water. Washed solids were collected and dried. The dried solids contained about 85% of the original cobalt content at a cobalt:nickel ratio of 190:1 and contained less than 0.1% sulfate.

*Example 2*

The original filtrate and washings obtained in Example 1 were combined. The resultant liquor contained:

|  | gr./lt. | mols/lt. |
|---|---|---|
| Co | 6 | 0.1 |
| Ni | 2 | 0.035 |
| $(NH_4)_2SO_4$ | 190 | 1.44 |
| $NH_3$ [free or as $(NH_4)_2CO_3$] | 24 | 1.41 |
| $CO_2$ | 10 | 0.23 |

Addition of about 0.2 mol/liter of $CO_2$ followed by heating of the solution in a closed vessel at about 160° C. for about 15 minutes caused a precipitate of cobalt carbonate. After washing with saturated ammonium carbonate solution and drying, precipitate was found to contain cobalt and nickel in the ratio of about 20:1. The filtrate contained less than 0.05 gram of cobalt per liter.

*Example 3*

A solution containing about 60 g./liter of nickel plus cobalt as sulfate in the ratio of about 1:1 was obtained from leaching a sulfide ore. Sufficient ammonia was added to neutralize free sulfuric acid and provide an ammonia to dissolved metal mol ratio of about 4:1. The adjusted solution was subjected for ten minutes to a $CO_2$ pressure of about 50 lbs./sq. in. during which time the temperature increased to about 60° C. Precipitate was collected, washed twice with ammonium carbonate solution and once with water, and dried. The dried material had a cobalt:nickel ratio of about 150:1 and amounted to a cobalt recovery of about 55%.

*Example 4*

The filtrate and washings obtained in Example 3 were combined as a solution containing approximately per liter:

|  | gr./lt. | mols/lt. |
|---|---|---|
| Cobalt | 15 | 0.25 |
| Nickel | 24 | 0.41 |
| Ammonium sulfate | 123 | 0.93 |
| $NH_3$ | 48 | 2.8 |
| $CO_2$ | 19.5 | 0.4 |

Addition of about 0.3 mol of $CO_2$ followed by heating at about 165° C. for ten minutes resulted in a substantially quantitative precipitation of the cobalt. The precipitate was collected, washed with saturated ammonium carbonate and found to contain a cobalt:nickel ratio of about 10:1. The filtrate contained about 23 grams/liter nickel with less than 0.1 gram of cobalt/liter.

From the foregoing discussion it has been presumed that there were substantially no other metals than the cobalt and nickel in the solution being treated. However, ores of these metals are frequently associated with copper. Ordinarily solutions thereof are treated to remove the copper but will have some residual copper content. So far as the process of the present invention is concerned, under these conditions the small amount of copper will remain in solution with the nickel. In many circuits this can be utilized to advantage. This is illustrated in the following example.

*Example 5*

A by-product leaching solution obtained in the treatment of a cobalt-nickel-copper sulfide ore was found to contain after adjustment approximately the following

| | Mols/liter |
|---|---|
| Cobalt sulfate | 0.75 |
| Nickel sulfate | 0.05 |
| Copper sulfate | 0.20 |
| Ammonium sulfate | 1.0 |
| Ammonia | 4.0 |

This solution was treated at about 40° C. under an atmosphere of $CO_2$ at about 50 lbs./sq. in. until 90% of the cobalt content was precipitated. Precipitation was completed in about ten minutes. After filtration, the filter cake was washed and dried. The dried residue contained about 80% of the cobalt at a cobalt:nickel plus copper ratio above about 140:1.

The term "liquor" as used in the claims is intended to include either solution or slurry.

I claim:

1. A method of recovering substantially nickel-free cobalt carbonate and a substantially cobalt-free solution of nickel from an aqueous liquor containing dissolved salts of nickel and cobalt selected from the group consisting of carbonate and sulfate, which comprises: adjusting the solutes content of said liquor to provide sufficient available ammonia and ammonium salt to solubilize all nickel and at least as much cobalt as is not present as carbonate to give a combined dissolved cobalt plus nickel content of up to 100 grams/liter for carbonates and 135 grams/liter for sulfates; increasing the carbonate concentration of said liquor to initiate precipitation of substantially nickel-free cobalt carbonate; continuing such treatment for only so long as substantially nickel-free cobalt carbonate precipitates; separating precipitate; adjusting the solutes content of the residual liquor to contain from about 2 to 4 mols of ammonia/liter and about 1 to 4 mols of ammonium carbonate/liter; heating said residual liquor to above about 140° C. and a pressure at least equivalent to that autogenously generated; maintaining said conditions for time sufficient to precipitate the remaining cobalt; and removing resultant precipitate, leaving a substantially cobalt-free nickel solution.

2. A method according to claim 1 in which the ammonium salt is sulfate.

3. A method according to claim 1 in which the ammonium salt is carbonate.

References Cited in the file of this patent

UNITED STATES PATENTS

| 2,290,313 | Caron | July 21, 1942 |
| 2,531,336 | Hills et al. | Nov. 21, 1950 |